US006225980B1

(12) United States Patent
Weiss et al.

(10) Patent No.: US 6,225,980 B1
(45) Date of Patent: May 1, 2001

(54) MULTI-FUNCTIONAL, ROTARY DIAL INPUT DEVICE FOR PORTABLE COMPUTERS

(75) Inventors: Lee E. Weiss; John Michael Stivoric; Gennady Yakovievitch Neplotnik, all of Pittsburgh, PA (US); Scott J. Cape, Racine, WI (US); Chris Kasabach, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 09/020,103

(22) Filed: Feb. 6, 1998

(51) Int. Cl.[7] ........................................ G09G 5/08
(52) U.S. Cl. .................... 345/161; 345/156; 345/157; 345/159; 345/167
(58) Field of Search .................... 345/161, 156, 345/157, 167, 159, 163, 184, 168; 200/6 A, 5 R

(56) References Cited

U.S. PATENT DOCUMENTS

| | | | | |
|---|---|---|---|---|
| 3,814,871 | * | 6/1974 | Osika ................................... | 200/6 A |
| 4,868,353 | * | 9/1989 | Ohta et al. .......................... | 200/5 B |
| 4,910,503 | * | 3/1990 | Brodsky ............................... | 345/161 |
| 4,982,618 | * | 1/1991 | Culver .................................. | 74/471 |
| 5,221,093 | * | 6/1993 | Adams ................................. | 273/429 |
| 5,270,689 | | 12/1993 | Hermann ............................. | 345/145 |
| 5,283,401 | * | 2/1994 | Schmucker .......................... | 200/6 A |
| 5,504,286 | * | 4/1996 | Tsai ...................................... | 200/5 R |
| 5,521,617 | * | 5/1996 | Imai et al. ........................... | 345/167 |
| 5,563,630 | * | 10/1996 | Tsakiris et al. ...................... | 345/160 |
| 5,563,631 | * | 10/1996 | Masunaga ............................ | 345/169 |
| 5,899,204 | * | 5/1999 | Cochran .......................... | 128/205.23 |
| 5,912,663 | * | 6/1999 | Cheng .................................. | 345/184 |
| 5,914,703 | * | 6/1999 | Herng-Chuen ...................... | 345/157 |
| 5,936,613 | * | 8/1999 | Jaeger et al. ........................ | 345/172 |
| 5,956,016 | * | 9/1999 | Kuenzner et al. ................... | 345/156 |
| 5,963,197 | * | 10/1999 | Bacon et al. ........................ | 345/163 |
| 5,982,355 | * | 11/1999 | Jaeger et al. ........................ | 345/161 |
| 6,005,299 | * | 12/1999 | Hengst ................................. | 307/10.1 |

FOREIGN PATENT DOCUMENTS

0831504A2  3/1998  (EP) .
0831504A3  12/1998  (EP) .

OTHER PUBLICATIONS

Asim Smailagic et al., *The VuMan 2 Wearable Computer*, IEEE Design & Test of Computers, Sep. 1993.
A. Smailagic et al., *The Design and Implementation of the VuMan Wearable Computer*, IEEE Design and Test of Computers, vol. 10, No. 5, 1993.
Bryce Cogswell et al., *Wearable Computers: Concepts and Examples*, Papers and Sidebars submitted to the C.A.C.M. Special Issue on Ubiquitous Computing , Feb. 24–25, 1993: M.I.T.
Daniel P. Siewiorek et al., *Interdisciplinary Concurrent Design Methodology As Applied To The Navigator Wearable Computer System*, Journal of Computer & Software Engineering, 2(3), 259–292 (1994).

(List continued on next page.)

*Primary Examiner*—William A. Cuchlinski, Jr.
*Assistant Examiner*—Marthe Marc-Coleman
(74) *Attorney, Agent, or Firm*—Kirkpatrick & Lockhart LLP

(57) ABSTRACT

A multiple switch assembly acts as an input device for computers. The switch assembly is comprised of a first input device which defines a circumference. A second input device is positioned within the circumference of the first input device. An interface is connected to the first input device and the second input device for producing output signals responsive to the first and second input devices. A portable computer utilizing such an input device is also disclosed.

30 Claims, 18 Drawing Sheets

OTHER PUBLICATIONS

Asim Smailagic et al., *The CMU Mobile Computers And Their Application For Maintenance*, Engineering Design Research Center, Carnegic Mellon University, Kluwer Academic Publishers, Boston, Jan. 1996.

Asim Smailagic et al., *Modalities Of Interaction With CMU Wearable Computers*, IEEE Personal Communications, pp. 6–16, Feb. 1996.

Asim Smailagic et al., *Benchmarking An Interdisciplinary Concurrent Design Methodology For Electronic–Mechanical Systems*, 32d Design Automation Conference Proceedings 1995, San Francisco, CA, Jun. 12–16, 1995.

Robin Yale Bergstrom, *Research To Reality: Academe As Resource*, Production/Sep. 1995.

Artifax, A Newletter From The Engineering Design Research Center at Carnegie Mellon University, Fall 1995.

Cristina H. Amon, *Concurrent Design And Analysis Of The Navigator Wearable Computer System: The Thermal Perspective*, IEEE Transactions on Components, Packaging, and Manufacturing Technology—Part A. vol. 18, No. 3, Sep. 1995, pp. 567–577.

Asim Smailagic, *User Centered Design For Embedded Systems: A Case Study In Rapid Prototyping*, Journal on Embedded Systems Design, Engineering Design Research Center, Carnegie Mellon University, date not currently known.

* cited by examiner

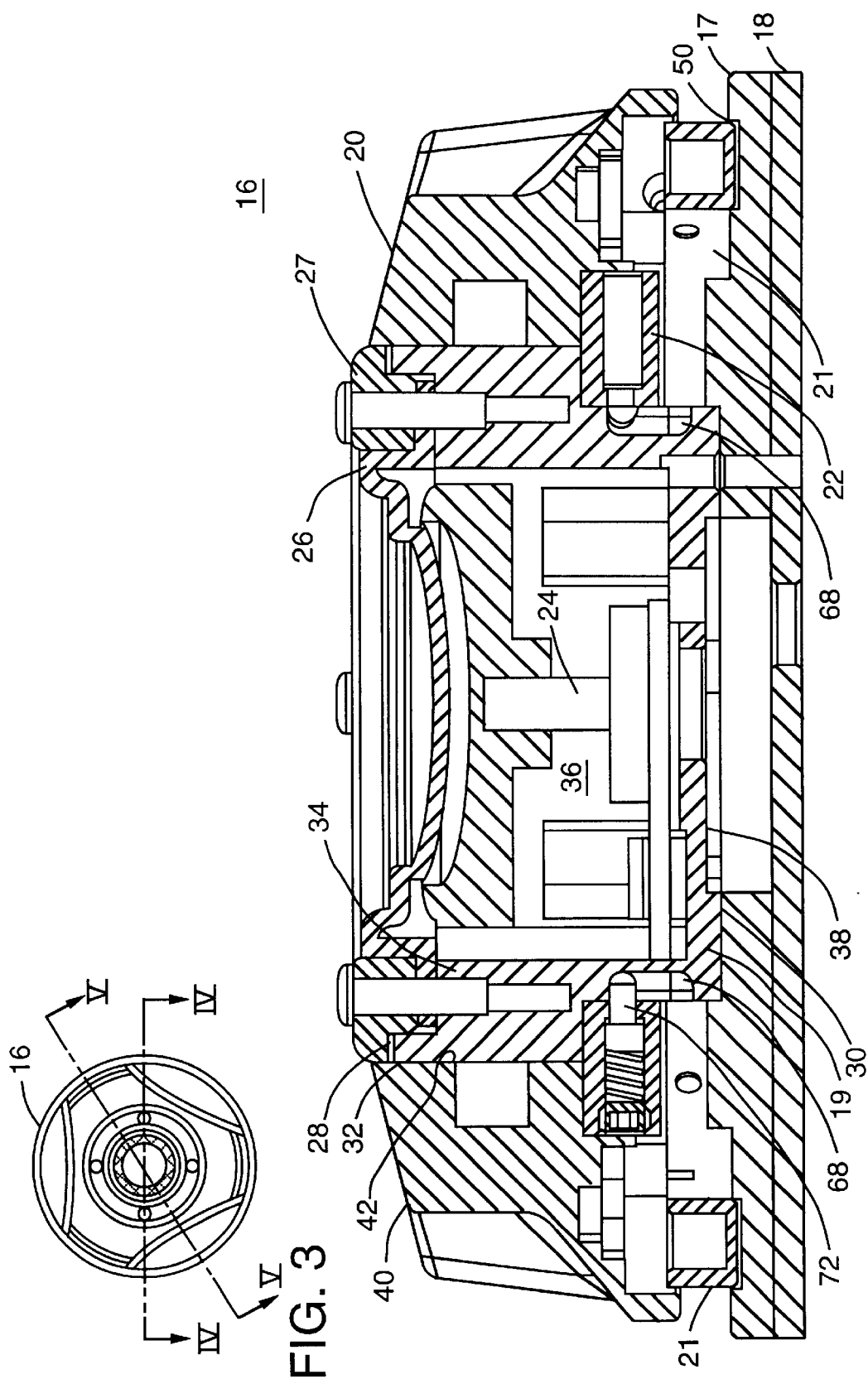

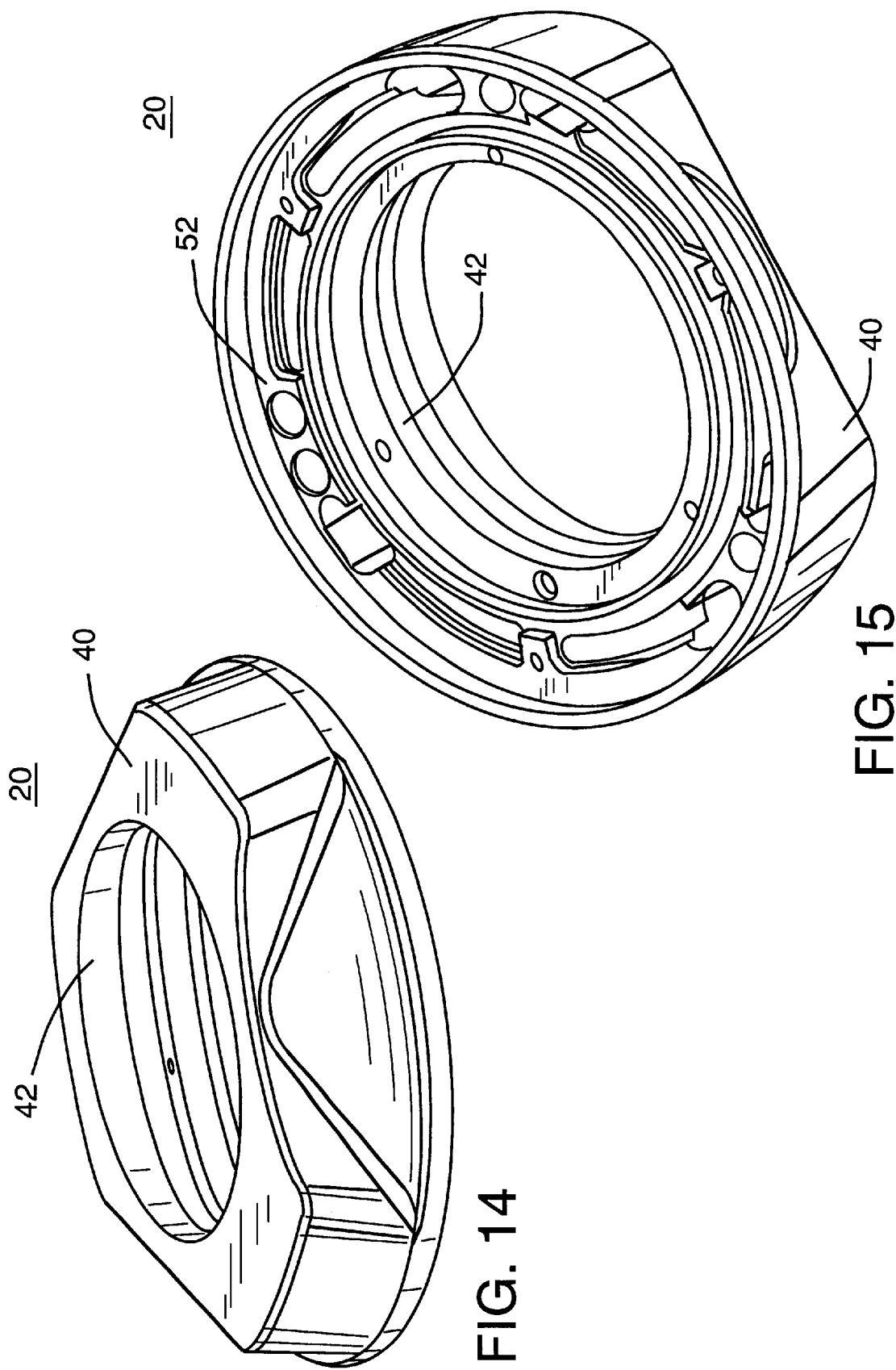

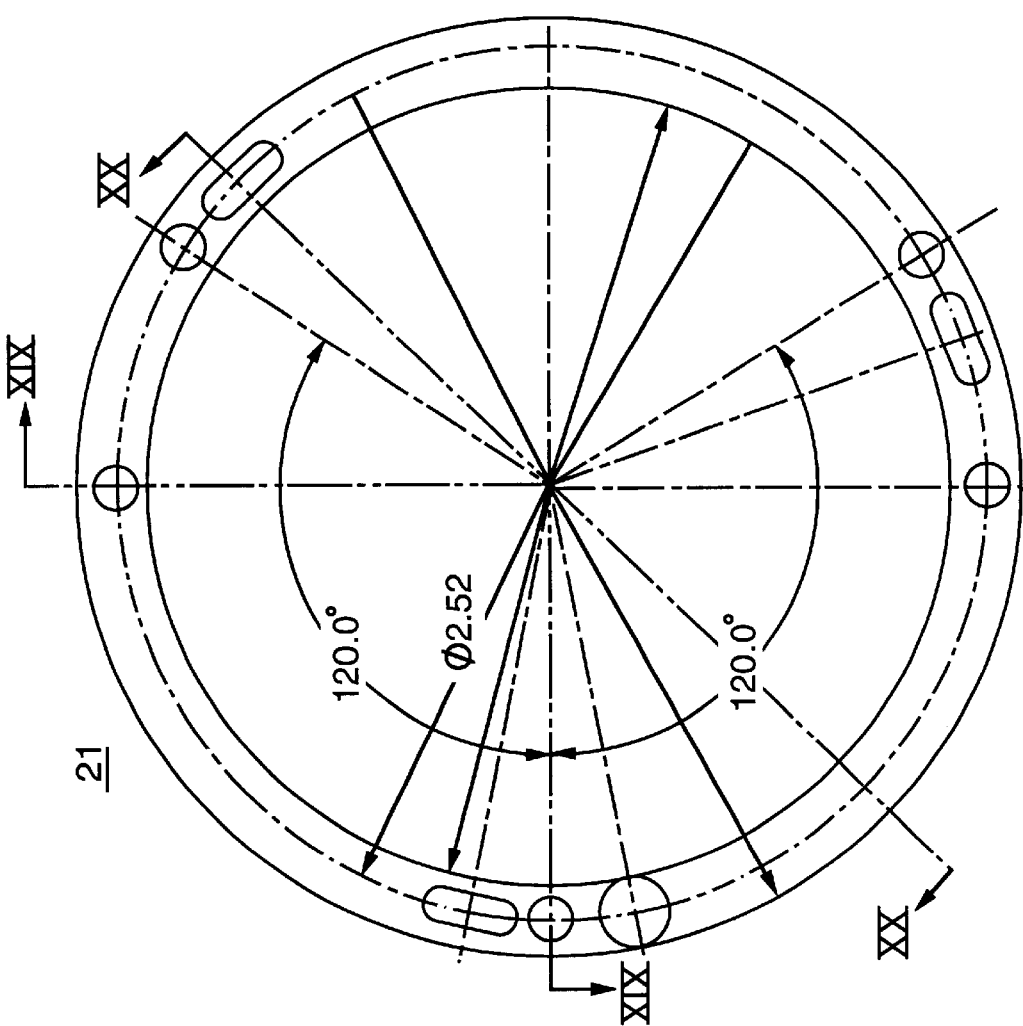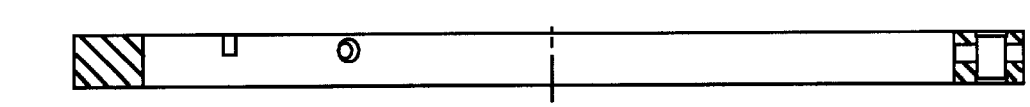

MULTI-FUNCTIONAL, ROTARY DIAL INPUT DEVICE FOR PORTABLE COMPUTERS

BACKGROUND OF THE INVENTION

1. Field of the Invention

The present invention is related to computers and, more particularly, to input devices for portable computers.

2. Description of the Background

Continued advances in semiconductor technology are producing high performance microprocessors requiring less power and less space. Reductions in power and space have led to portable computers. Decades of research in computer science have provided the technology for hands-off computing using speech and gesturing for input. Miniature heads-up displays weighing less than a few ounces combined with mobile communication technology make it possible for users to access information from virtually anywhere. It is even possible to sense a user's position such that information can be superimposed upon the user's workspace.

Currently, wearable and other types of portable computers are all hampered by the need for the user to be able to input information or commands in an ergonomic and convenient manner. The use of a full sized keyboard cancels many of the benefits gained by having a small portable or wearable computer. The provision of the keyboard also assumes that the user of the computer, perhaps maintenance workers, are capable of using the keyboard in an efficient manner. A mouse input device overcomes the problems associated with a keyboard, but the use of the mouse becomes impractical in confined areas where there is no flat surface on which to operate the device. Trackballs alleviate that problem, but many people find such devices difficult to operate. Furthermore, the delicate mechanism of the trackball quickly becomes inoperative in the manufacturing or maintenance environment where workers' hands are often heavily soiled or gloved. Voice input is hampered by the difficulties inherent in enabling computers to understand the spoken word.

The development of mobile computers has been ongoing at Carnegie-Mellon University, the assignee of the present invention, from at least as early as 1991. A system known as VuMan 1 was conceived in 1991. That system allowed the user to maneuver through the blueprints of a house using three buttons for input, much like a mouse. Output was provided on a commercially available head-worn display which gave the illusion of viewing a personal computer screen from about five feet. A full discussion of the VuMan 1 can be found in Akella et al. "Concurrent Engineering: A Prototyping Case Study," Proceedings of the 3rd IEEE International Workshop on Rapid System Prototyping, Research Triangle Park, N.C., June 1992.

The next generation of the computer was referred to as VuMan 2. The VuMan 2 computer was built in 1992 for the purpose of allowing the user to navigate the Carnegie-Mellon University campus. The VuMan 2 computer had a database of buildings, departments, and people so that a user unfamiliar with the campus could find the location of an appointment, get information on a faculty member such as a phone number or office number, or locate a specific building on the campus. Like the VuMan 1 computer, the VuMan 2 computer used the same commercially available head-worn display and three buttons for input. The VuMan 2 computer, however, was not dedicated to a single application. New applications could be loaded via a flash memory card. A second application developed for the VuMan 2 computer was an electronic maintenance manual for an alternator. The user could scan through manual pages then access the corresponding diagram. Additional information about the VuMan 2 computer is found in Smailagic, et al., "A Case Study In Imbedded Systems Design: The VuMan 2 Wearable Computer," IEE Design and Test of Computers, Volume 10, No. 3, pages 56–67, September 1993.

The initial application of a third generation mobile computer, the Navigator 1 computer, built in 1993, was a campus navigational tool similar to the VuMan 2 computer. Unlike the VuMan 2 computer, the Navigator 1 computer could use speech as input, allowing completely hands-free operation. The Navigator 1 speech recognition system was speaker-independent and had a 200 word vocabulary. A mouse was also available in case the speech recognition rate was low or speaking was undesirable. Another major difference between the Navigator 1 computer and the VuMan 2 computer was that the Navigator 1 computer was a general purpose computer while the VuMan 2 computer was embedded. The Navigator 1 computer ran the Mach operating system, allowing applications to be developed on a Unix workstation and then transferred to the Navigator platform. Software developers could use the standard Unix environment, such as X Windows and Shell scripts, in their applications. A third difference is that the Navigator 1 computer's architecture was modular so that the hardware could be reconfigured based upon the application. Additional information can be found in Siewiorek et al., "An Interdisciplinary Concurrent Design Methodology as Applied to the Navigator Wearable Computer System," Journal of Computer and Software Engineering, Vol. 3, No. 2, 1994.

The next generation of mobile computer, known as the VuMan 3, incorporated a new housing designed to withstand shock, temperature, water, and dirt. This generation of mobile computer was used as a maintenance assistant, and is referred to as VuMan MA when used in that application. This generation used an input interface which is a combination of a rotary dial and a push button. The speed and ease for a user to scroll through many options that may appear on the screen are the reasons for the use of a rotary dial. Further information may be found in U.S. patent application Ser. No. 08/399,203 entitled Portable Computer System With Ergonomic Input Device filed Mar. 6, 1995, and assigned to the same assignee as the present invention.

The next generation in mobile computing at Carnegie Mellon University was the Navigator 2 computer which is a general purpose system directed toward multi-media applications. The speech recognition system, having a secondary, manually controllable cursor, offers complete control over the application in a hands-free manner, allowing the operator to perform equipment inspections with minimal interference from the wearable system. The position of the cursor is manually controlled through the use of a joy stick.

Despite advances, speech recognition is often not the best mode of input due to noise in the environment, regional variations in speech, etc. Furthermore, advances in manufacturing toward reducing the size of components cannot be fully realized due to the fact that the human hand must have an input device of a given size which can be manipulated or actuated in dirty environments, or environments where the hand is gloved. Thus, the need exists for a rugged, ergonomic, inexpensive input device that can be used with a portable computer system to allow the full benefits of the portable computer system to be realized.

SUMMARY OF THE INVENTION

The present invention is directed to an input device for computers. The present invention may take the form of a multiple switch assembly which is comprised of a first input device which defines a circumference. A second input device is positioned within the circumference of the first input device. An interface is connected to the first input device and the second input device for producing output signals responsive to the first and second input devices.

The first input device may take the form of a rotary dial while the second input device may be enabled by a rotary dial which can be depressed from a first vertical position into a second vertical position. An interlock may be provided to prevent the rotatable dial from being rotated while it is being depressed, and to prevent the rotatable dial from being depressed while it is being rotated. A third input device may be positioned within the circumference of the rotary input device. The third input device may take the form of a joystick or a momentary switch.

The present invention is also directed to a portable computer comprising a housing. A first input device defines a circumference. A second input device is positioned within the circumference of the first input device. An input interface is responsive to the first and second input devices. A display is connected to the housing. A central processing unit is connected to the display and is responsive to the input interface for displaying information on a display. The first and second input devices, the input interface, and the central processing unit are carried by the housing in a watertight manner.

Current input devices such as mice, trackballs, and joysticks, typically have at most two functions associated with them, point and select. Such devices are designed for use only in clean environments such as the office or home. Such devices are not rugged. In contrast, the present invention disclosed herein is ergonomically designed to actuate multiple functions, i.e., toggling, pointing, selecting, etc., with single-handed operation. The present invention is orientation independent, rugged, and can be operated by people wearing gloves or who otherwise have compromised manual dexterity. The invention can be used as an input device for mobile and wearable computer applications including computer-assisted maintenance, manufacturing, training, inventory, and emergency response. The watertight nature of the present invention makes the device very rugged for use in harsh environments where it may be exposed to dirt, mud, water, shock, and vibration. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein:

FIG. 3 is top view looking down onto the multiple switch assembly;

FIG. 4 is a cross-sectional view of the multiple switch assembly taken along the lines IV—IV in FIG. 3;

FIGS. 14, 15, 16, and 17 illustrate details of the dial;

FIGS. 18, 19, and 20 illustrate the details of the switch ring;

DESCRIPTION OF THE PREFERRED EMBODIMENTS

Figure 1:
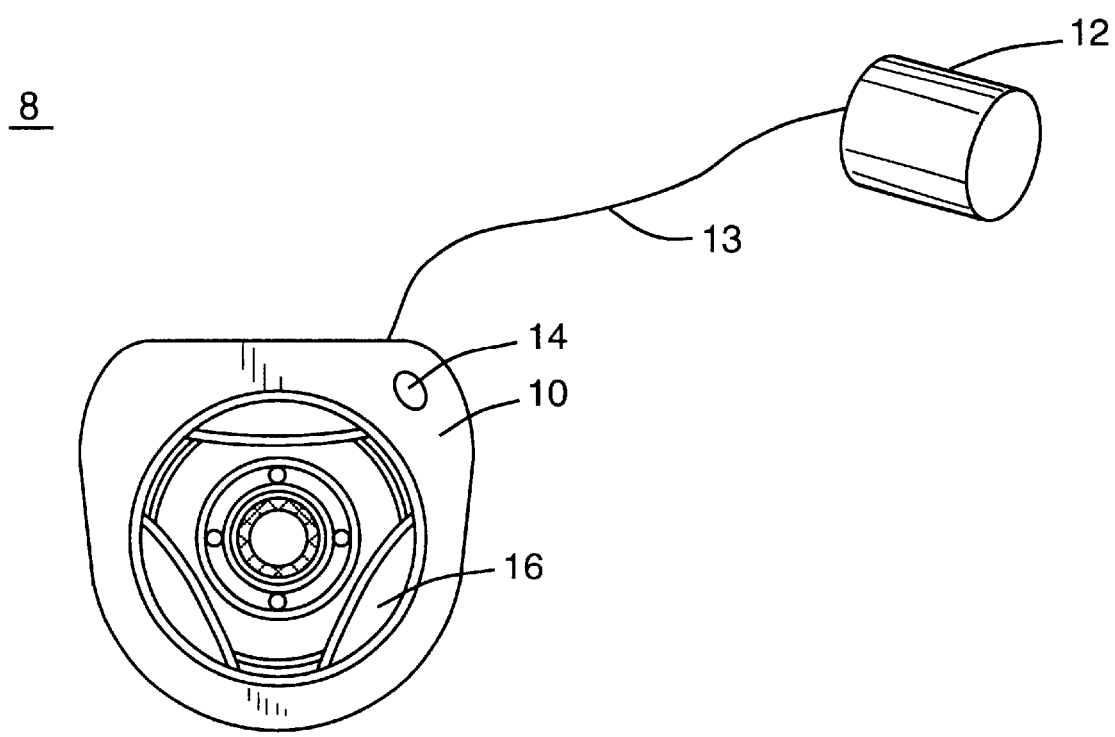
FIG. 1 illustrates a wearable computer system constructed according to the teachings of the present invention.

FIG. 1 illustrates a wearable computer system 8 constructed according to the teachings of the present invention. The computer system 8 is comprised of a computer 10 and a display device 12 connected by a conductor 13. The computer 10 carries an on-off or reset switch 14 as well as a multiple switch assembly 16. The computer 10 is designed to be worn by the user such as, for example, via a belt (not shown) while the display device 12 is designed to be head-word via a headband (not shown). The display device 12 may be a commercially available display device available from Displaytech, such as the model No. DDK0307. An important aspect of the present invention is the multiple switch assembly 16 which provides input signals for controlling the computer 10.

Figure 2:
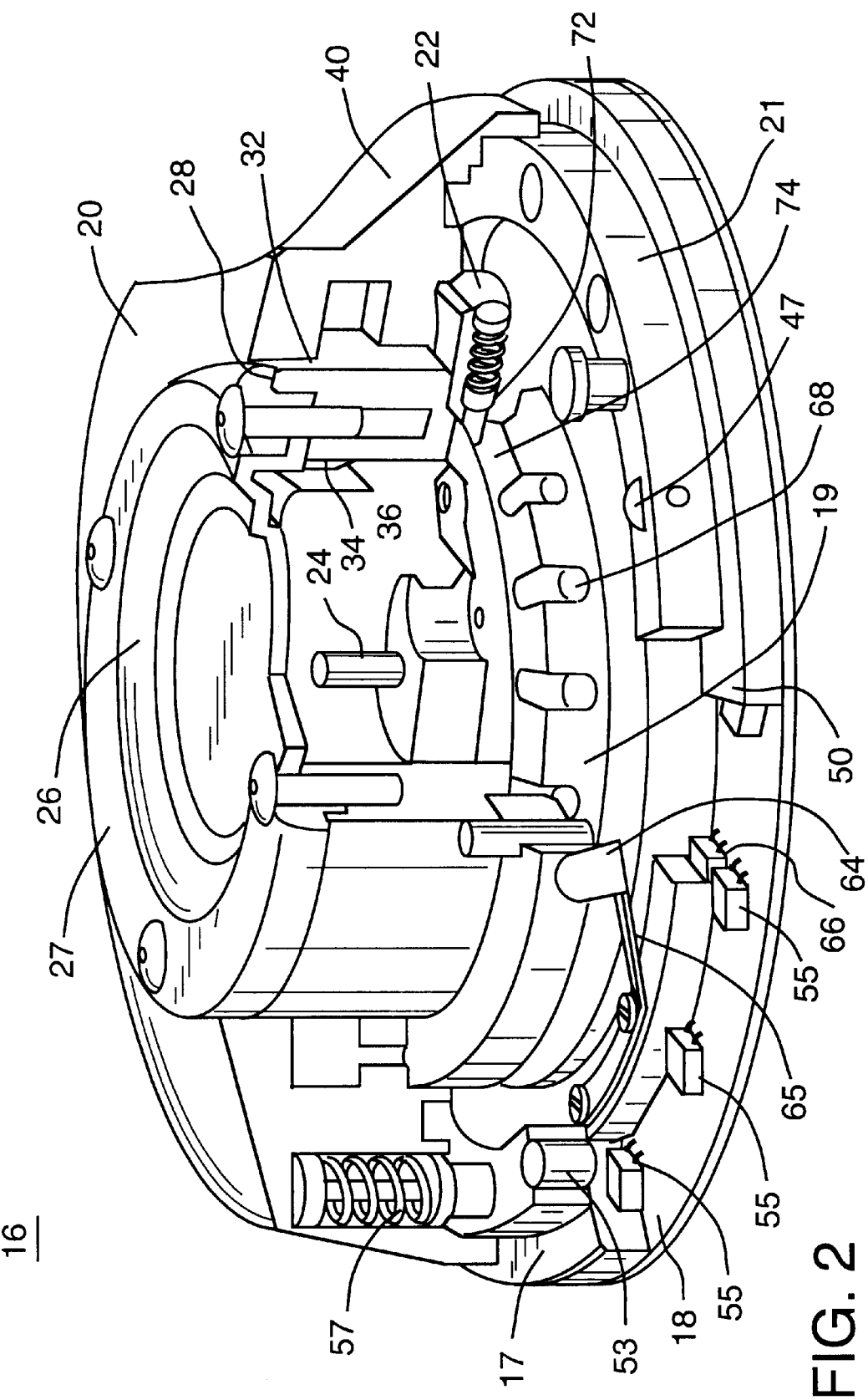
FIG. 2 illustrates the multiple switch assembly with parts broken away.

The switch assembly 16 is illustrated in FIG. 2 as a perspective view with parts broken away. The switch assembly 16 is also illustrated in FIG. 3, which identifies the orientation of two cross-sectional views illustrated in FIGS. 4 and 5, and as an exploded view in FIG. 6. The multiple switch assembly 16 will now be described in connection with FIGS. 2, 4, 5, and 6.

Figure 8:
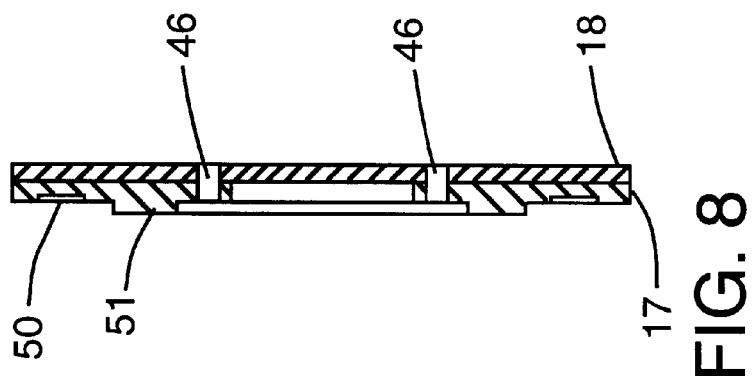
FIGS. 7, 8, and 9 illustrate details of the insulating cover overlaying the printed circuit board.
Figure 9:
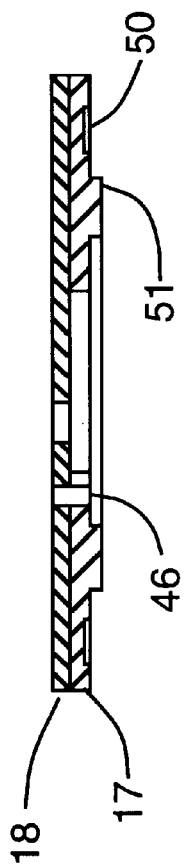
Figure 7:
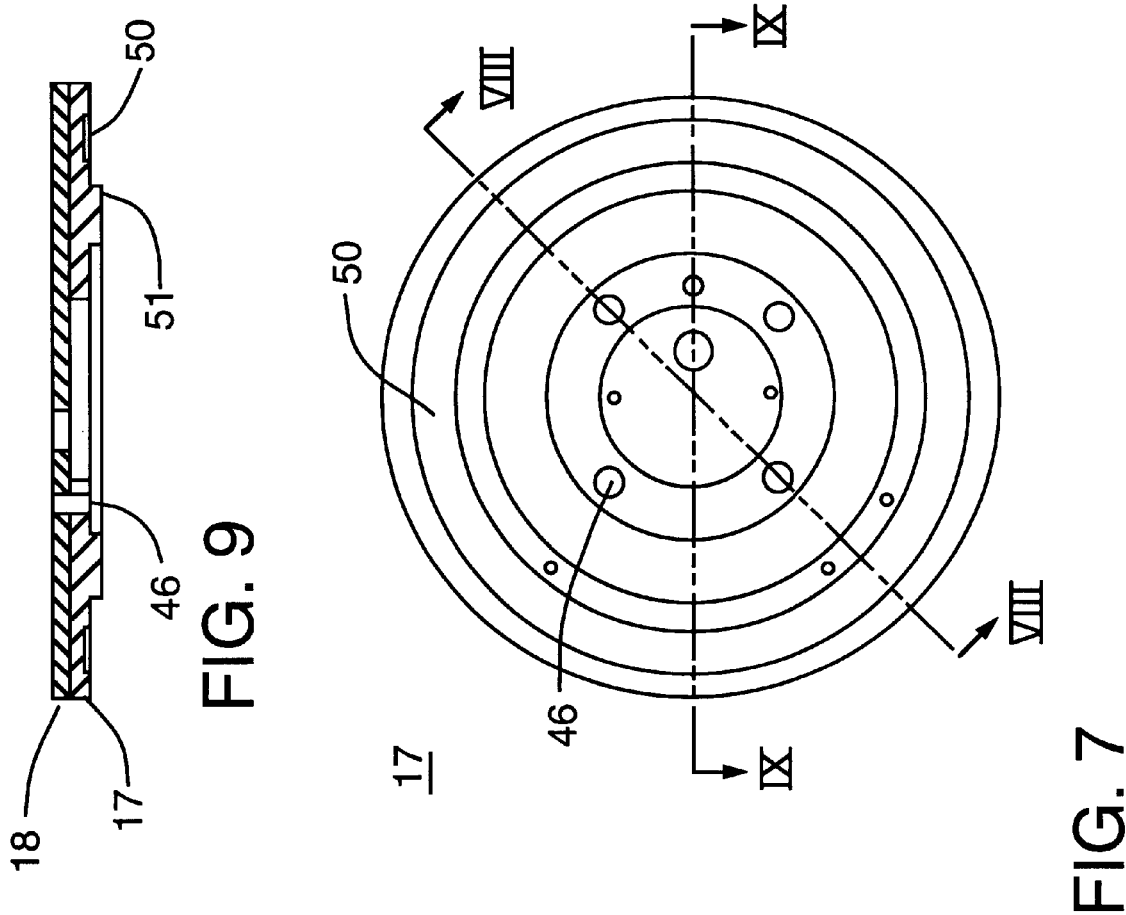
Figure 11:
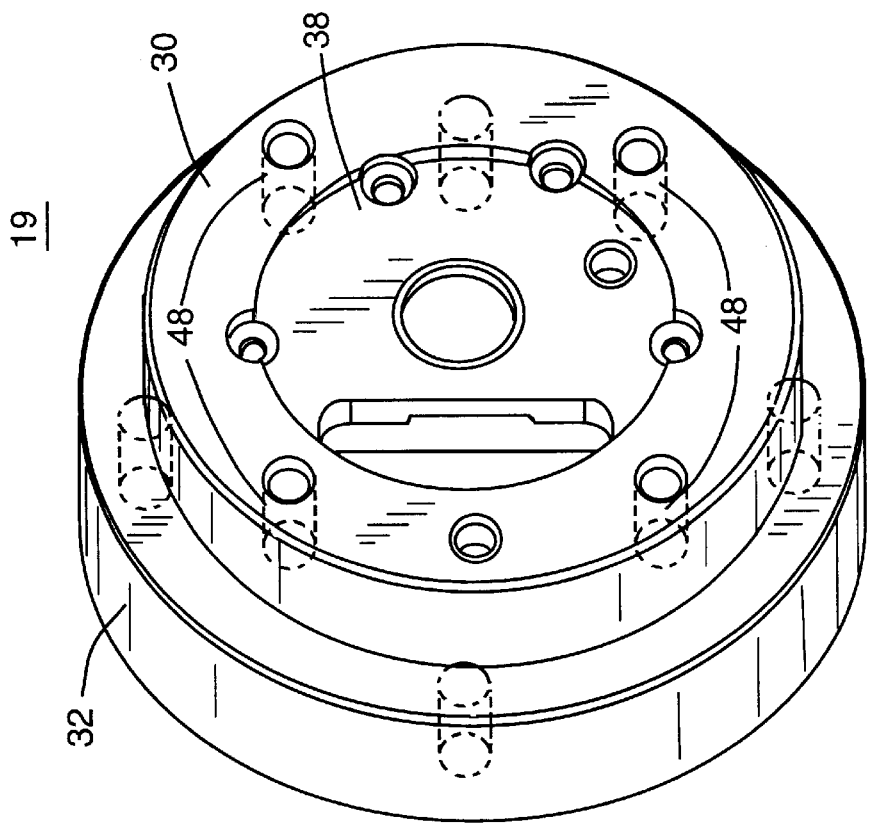
FIGS. 10, 11, 12, and 13 illustrate details of the spine before milling of the horizontal groove and plurality of vertical grooves.
Figure 10:
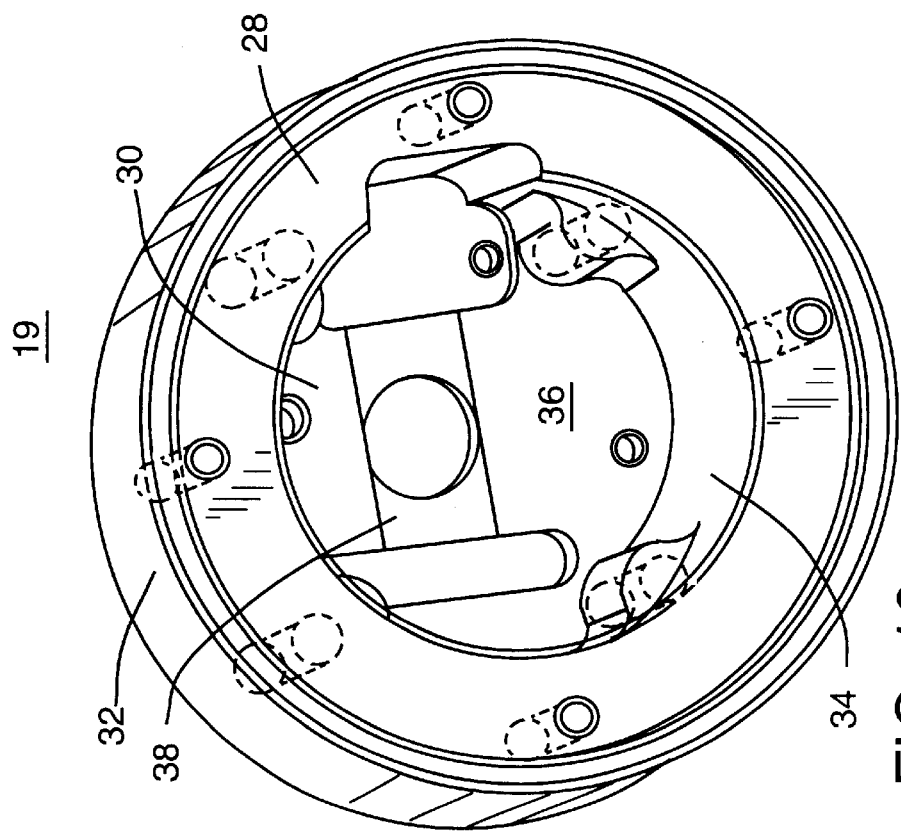
Figure 12:
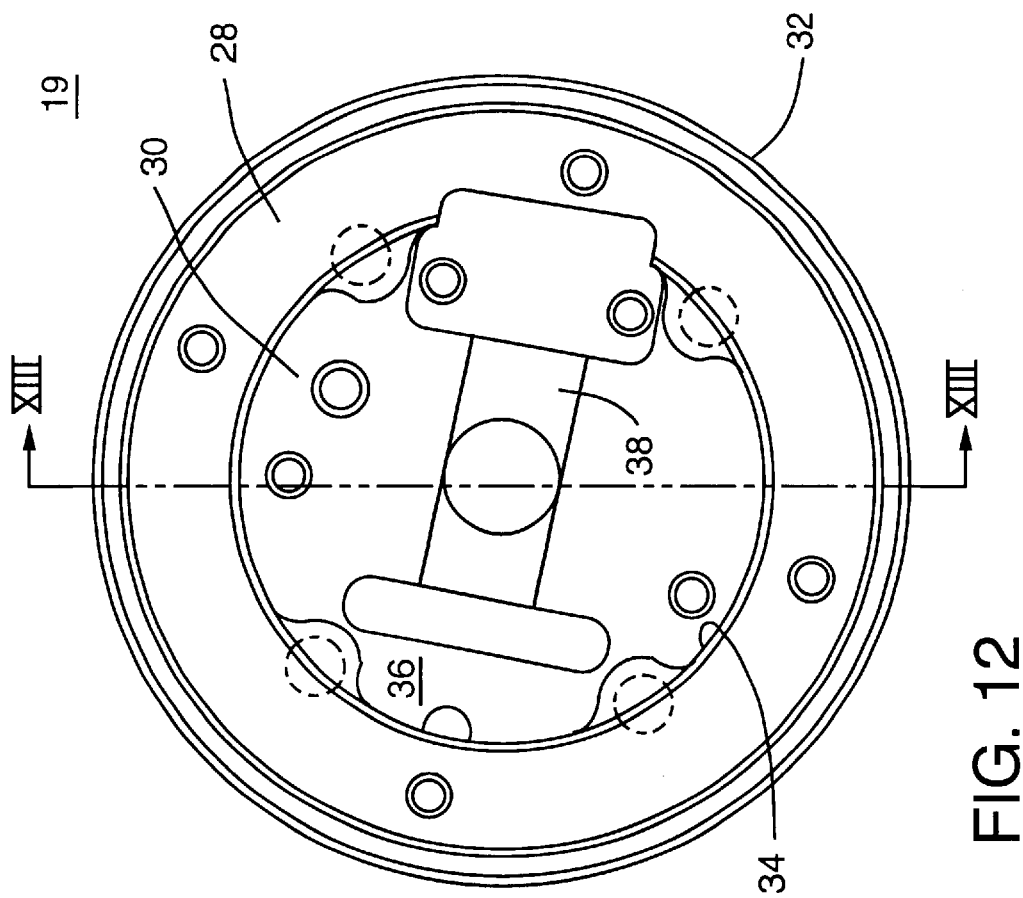
Figure 13:
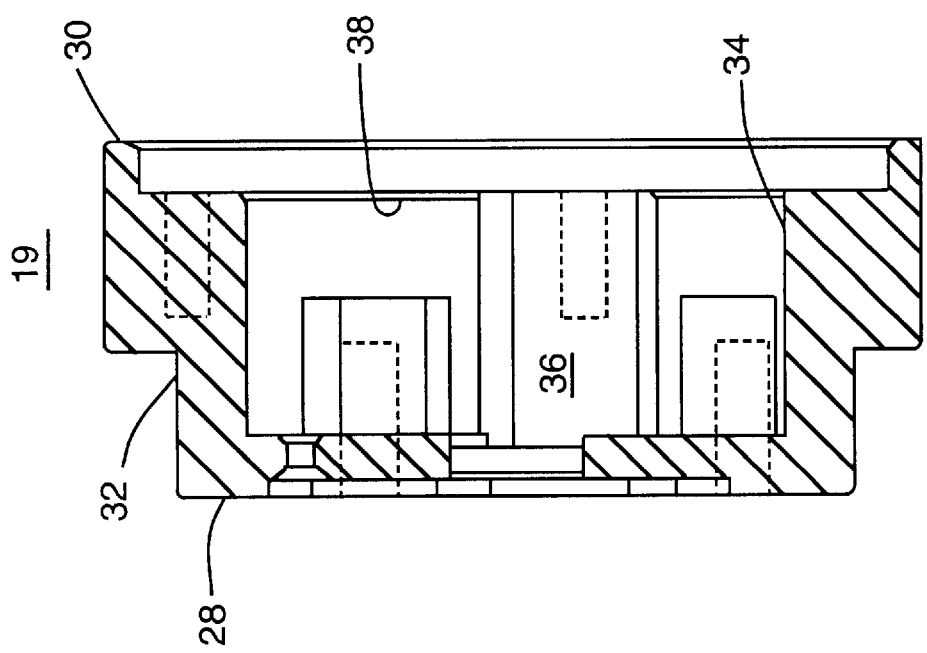
Figure 17:
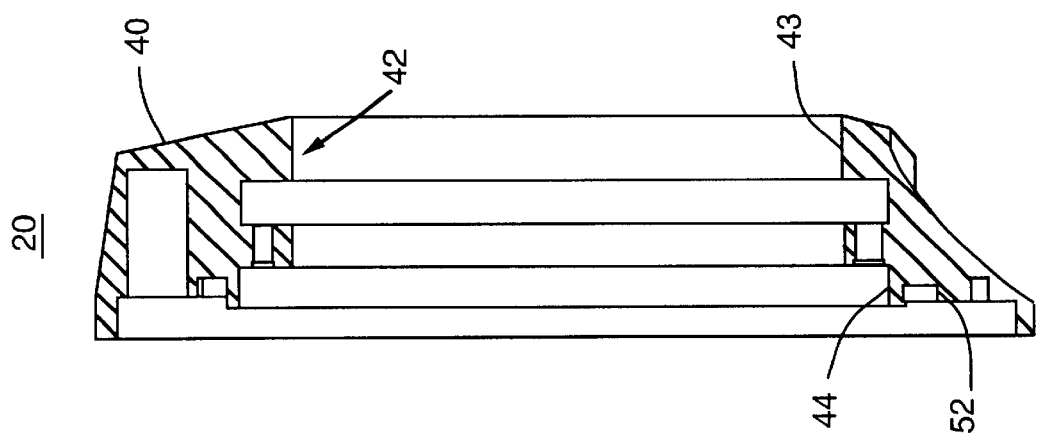
Figure 16:
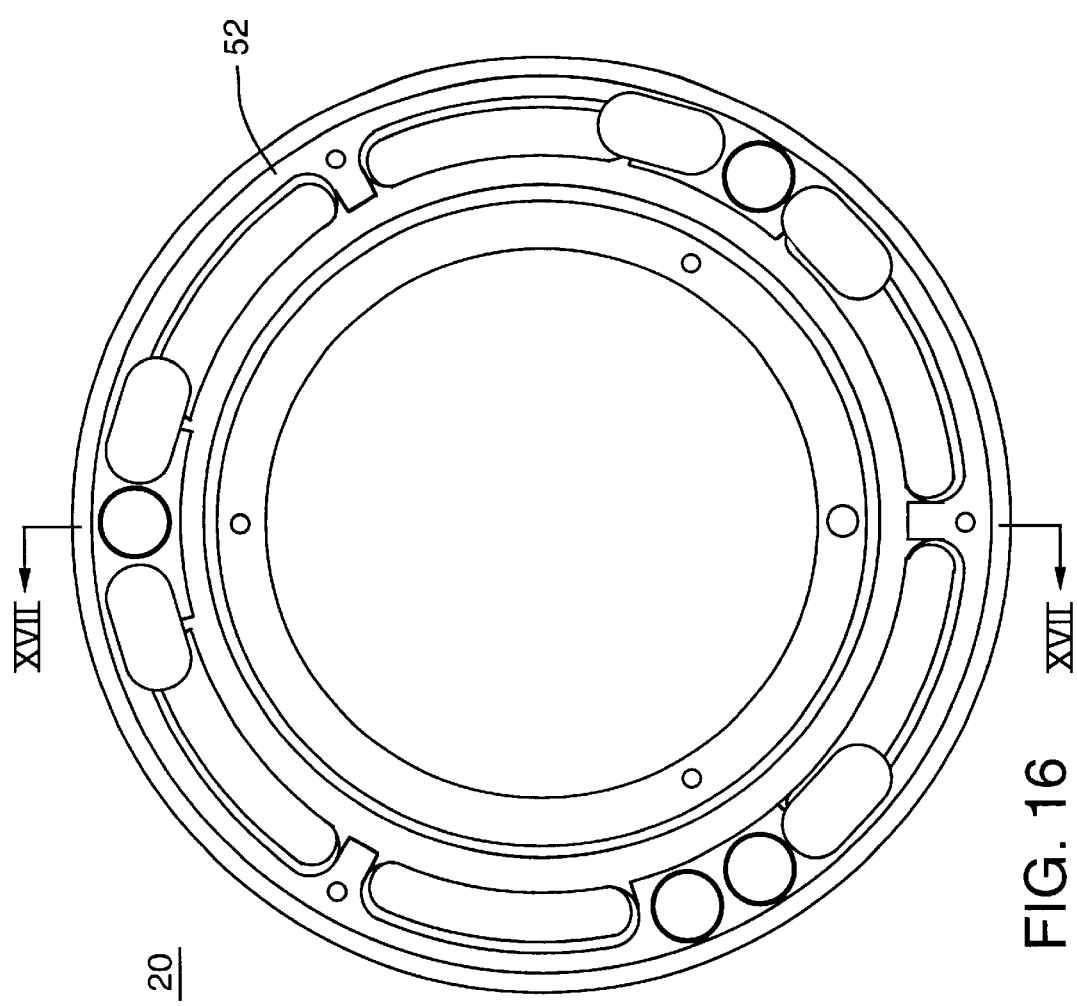
Figure 22:
FIGS. 21 and 22 illustrate the details of the snap ring.
Figure 21:
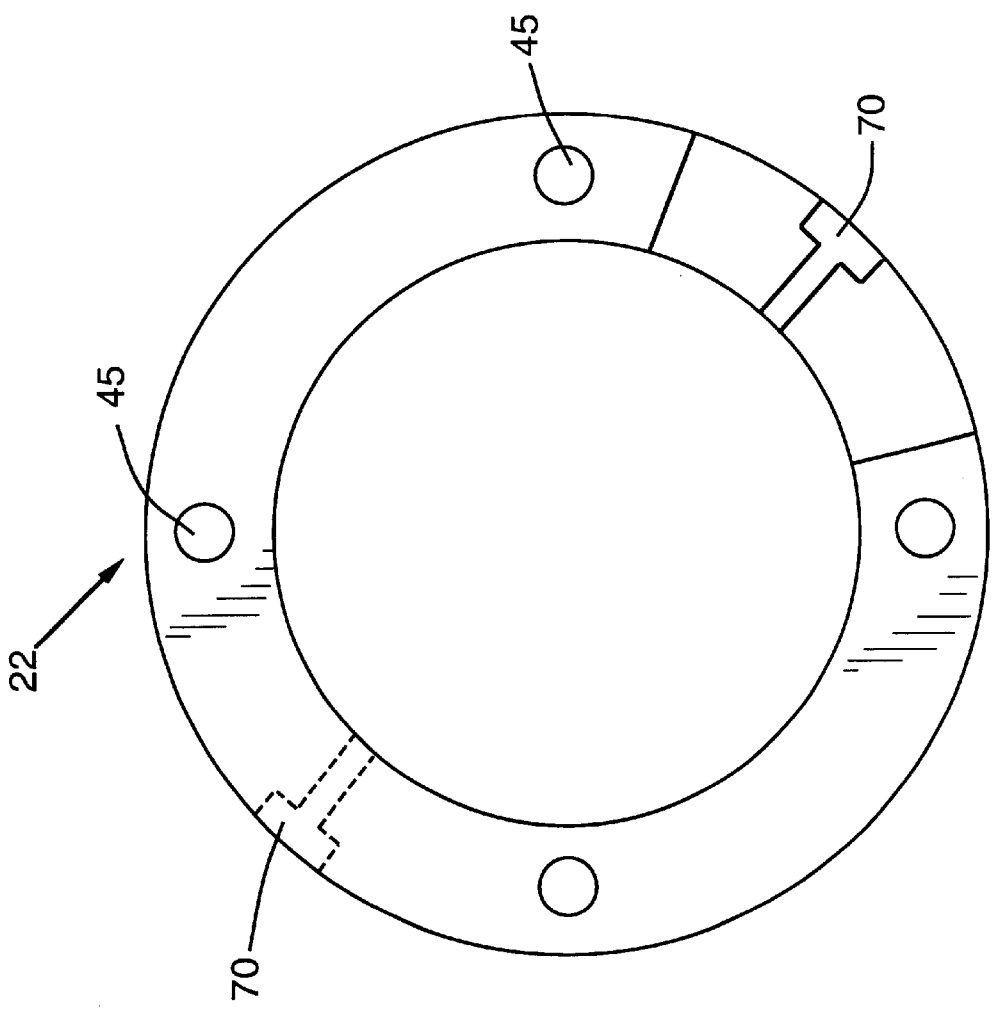
Figure 24:
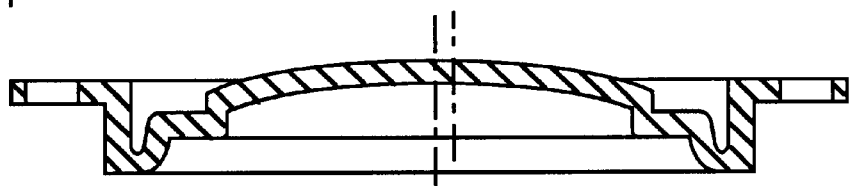
FIGS. 23 and 24 illustrate details of the water tight membrane.
Figure 23:
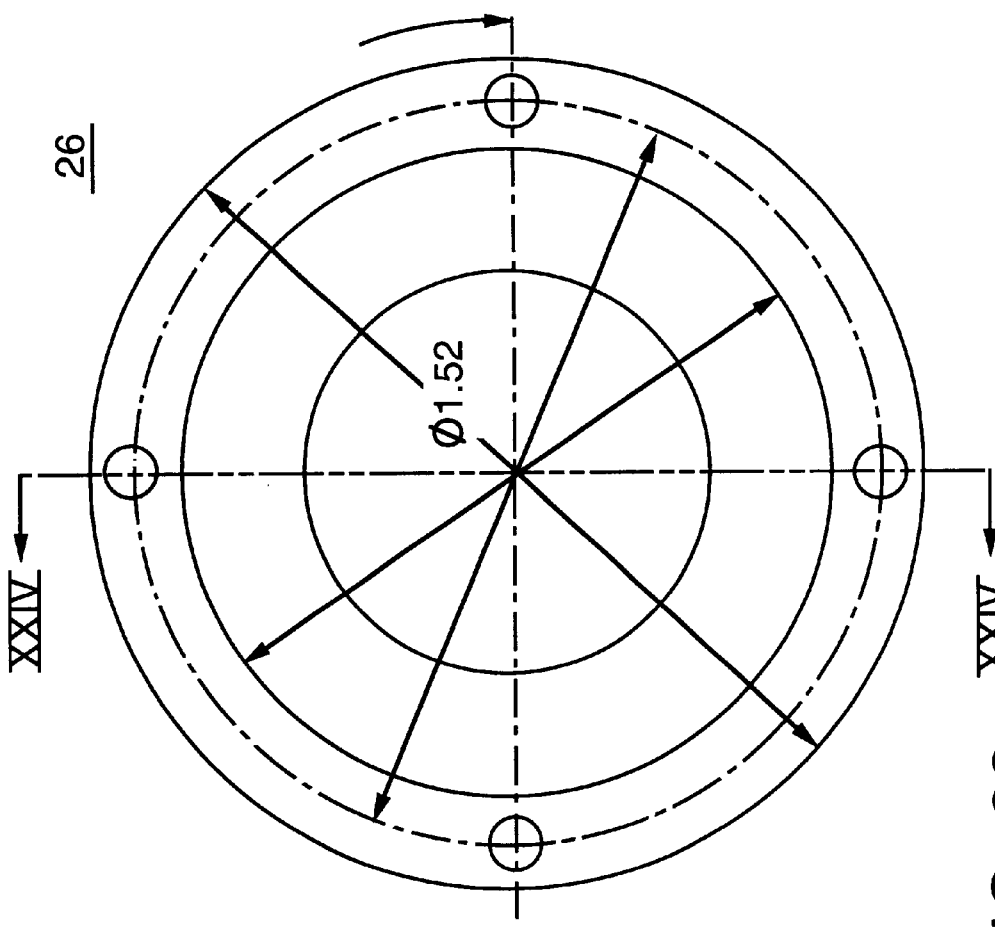

The multiple switch assembly 16 is comprised in the illustrated embodiment of six major components, an insulating member 17 overlying a printed circuit board (PCB) 18, a spine 19 rigidly connected to the printed circuit board 18, a rotatable dial 20 which rotates around the periphery of spine 19, a switch ring 21 carried by dial 20, and a snap ring 22 rigidly connected to dial 20. The switch assembly 16 also includes a joy stick 24 carried within spine 19, and a watertight membrane 26 connected to the spine 19 by a top ring 27 in a manner so as to protect joystick 24. Each of the insulating member 17, printed circuit board 18, spine 19, dial 20, switch ring 21, snap ring 22, membrane 26, and top ring 27 is illustrated in FIGS. 2, 4, 5, and 6. The construction and interaction of those components will be described further in connection with FIGS. 2, 4, 5, and 6. Should the reader require more information about the construction of a component and the component's interaction with other components of the switch assembly 16 than the information illustrated in FIGS. 2, 4, 5, and 6, the reader may refer to:

FIGS. 7, 8, and 9 for details of the insulating member 17,

FIGS. 10, 11, 12, and 13 for details of the spine 19,

FIGS. 14, 15, 16, and 17 for details of the rotatable dial 20,

FIGS. 18, 19, and 20 for details of the switch ring 21,

FIGS. 21 and 22 for details of the snap ring 22,

FIGS. 23 and 24 for details of the watertight membrane 26, and

Figure 25:
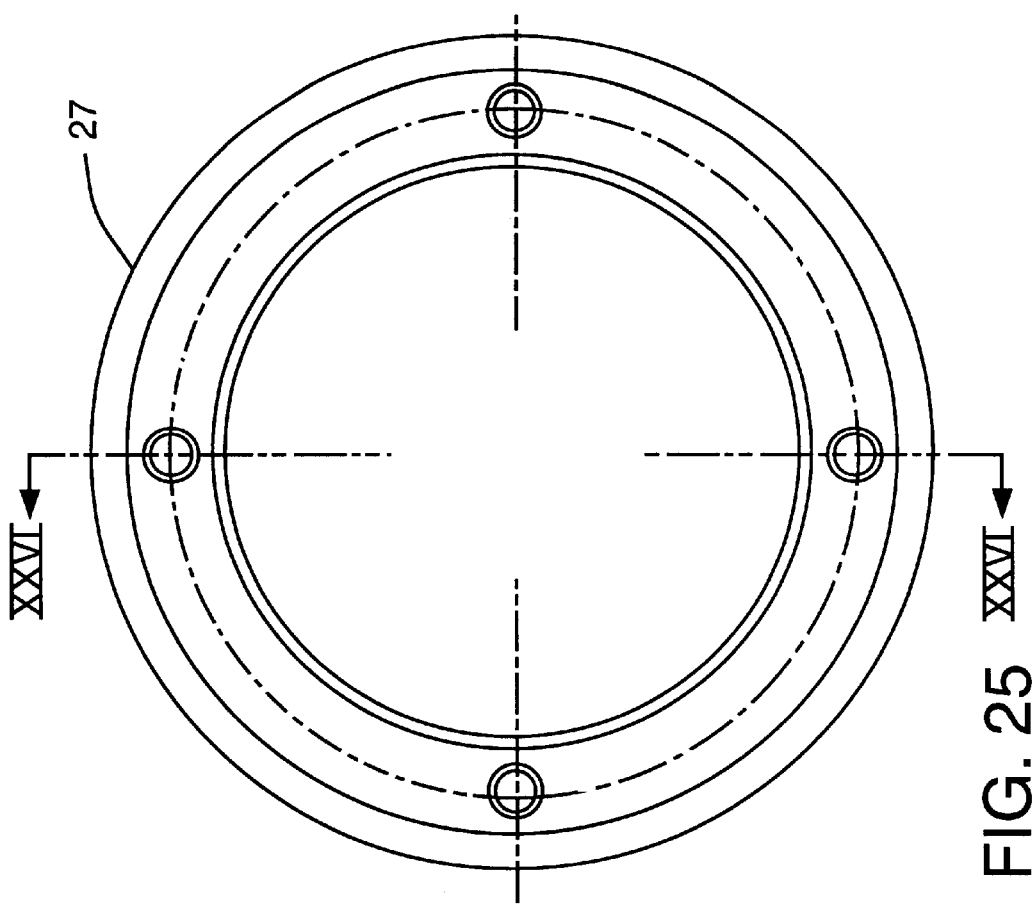
FIGS. 25 and 26 illustrate the top ring.
Figure 26:
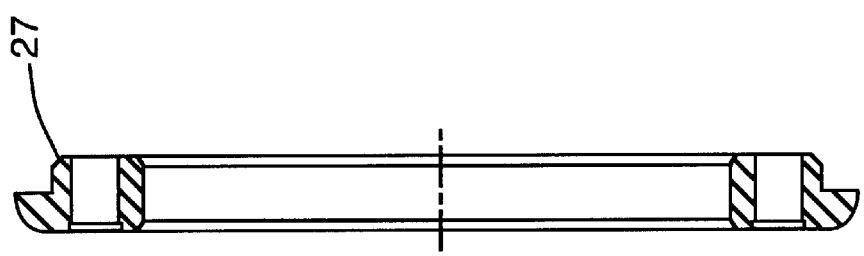

FIGS. 25 and 26 for details of the top ring 27.

The joystick 24 is a commercially available component available from Interlink as part No. 90-45785. The reader should further recognize that the multiple switch assembly 16 illustrated in the figures and described herein is but one embodiment of the switch assembly. Other embodiments of the switch assembly wherein the dial 20 does not rotate, the joystick 24 is replaced by a switch, as well as other combinations of components, are also possible. All such combinations fall within the scope of this disclosure.

The spine 19 is generally circular in shape, having a top surface 28 configured to receive the watertight membrane 26 and top ring 27, a bottom surface 30, configured to receive the insulating member 17, an outside diameter 32 configured at an upper portion to permit rotation of the dial 20 and configured at a lower portion to permit rotation of the snap ring 22, and an inside diameter 34 which defines an inner chamber 36 within which the joystick 24, or other type of input device, is connected to a portion 38 of the bottom surface 30. The dial 22 has an outer surface 40 which is generally triangular in shape as seen in FIGS. 1, 3, and 14. The dial 22 has an inner surface 42, seen best in FIG. 17, an upper portion 43 of which is designed to mate with the outside diameter 32 of the spine 19 and an expanded portion 44 which is designed to rigidly receive the snap ring 22.

Figure 6:
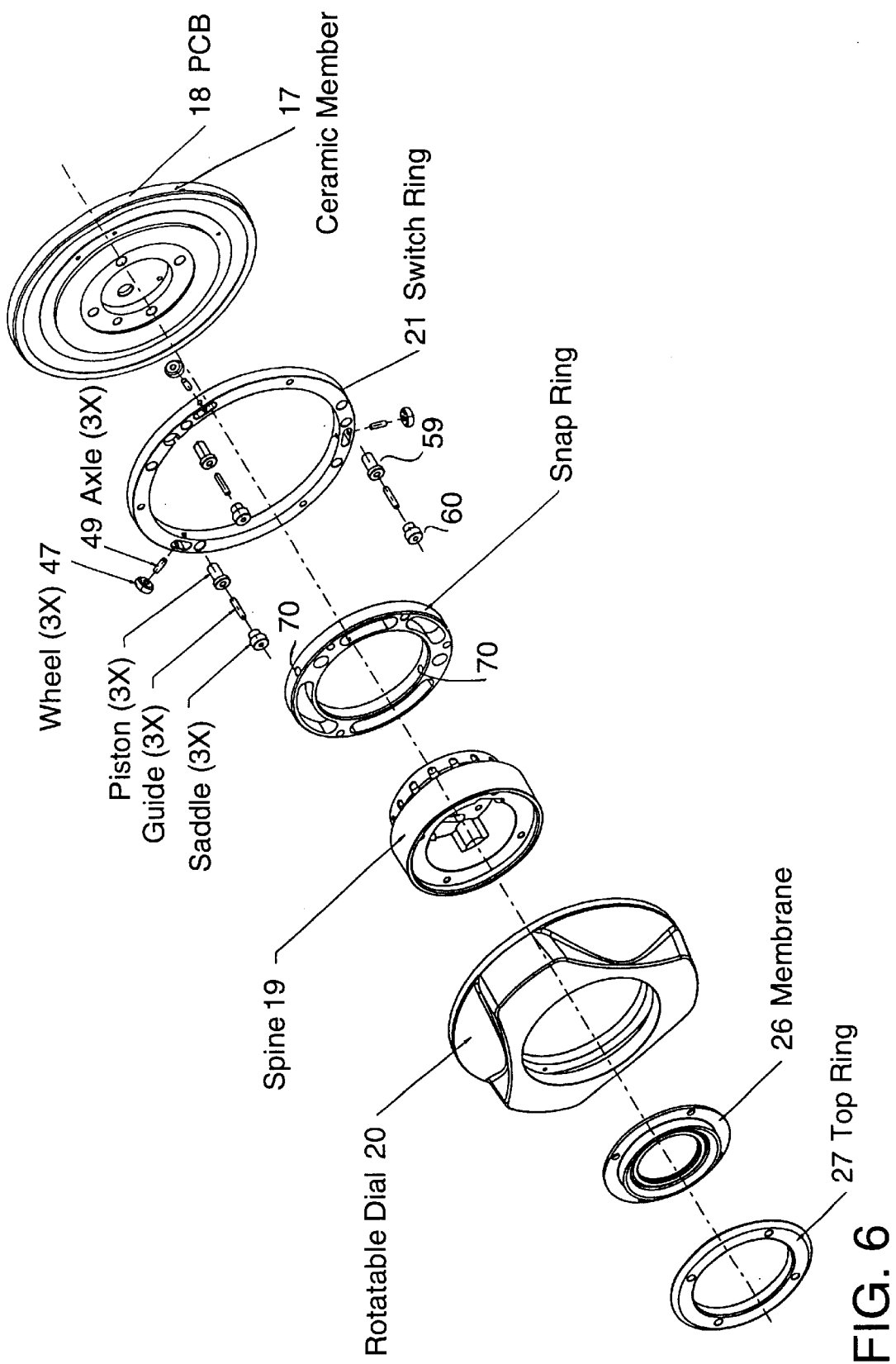
FIG. 6 is an exploded view of the multiple switch assembly.

Referring to FIG. 6, the dial 20 may be slipped over the spine 19. The snap ring 22 is then positioned in expanded portion 44 and fixed to dial 20 via pins or screws extending through openings 45 (see FIG. 21) in snap ring 22. The snap ring 22 thus prevents dial 20 from sliding up and off the spine 19. The switch ring 21 (the function of which will be described later) is fixed to the underside of the dial 20. The switch ring 21 carries wheels 47 on axles 49. The printed circuit board 18 is rigidly attached to the insulating member 17, which is then rigidly attached to the bottom surface 30 of the spine 19. In that manner, the dial 20 is restrained from sliding down and off the spine 19 while being free to rotate with respect to the spine 19 and the printed circuit board 18. As dial 20 rotates, the snap ring 22 and switch ring 21 rotate with it.

The insulating member 17 may be rigidly connected to the bottom surface 30 of the spine 19 through a plurality of screws (not shown) extending through a plurality of openings 46 (see FIG. 7) extending therethrough which mate with a plurality of threaded bores 48 (seen best in FIG. 11) in the bottom surface 30 of the spine 19. When the insulating member 17 is connected to the bottom surface 30 of the spine 19, a portion 50 (see FIG. 7) of a top surface 51 of the insulating member 17 provides a runway for wheels 47. Additionally, portion 50 is juxtaposed with the switch ring 21.

The switch ring, as shown in FIGS. 18, 19, and 20, is an annular ring. The switch ring 21 provides a variety of functions. For example, it has already been mentioned that the switch ring 21 carries the plurality of wheels 47 which enable the switch ring 21, and the rotatable dial 20 to which the switch ring 21 is connected, to rotate relative to the spine 19 and insulating member 17/printed circuit board 18. Referring to FIG. 2, the switch ring 21 preferably carries at least two magnets 53 located 180° apart. The magnets 53 cooperate with a plurality of Hall effect sensors 55 carried on printed circuit board 18 and located just under the surface of portion 50 of the insulating member 17. The operation of Hall effect sensors is well known in the art. The position of the magnet 53 relative to any of the Hall effect sensors 55 enables circuitry, to be described later, to provide an output signal based on the position of the rotary dial 20.

Figure 5:
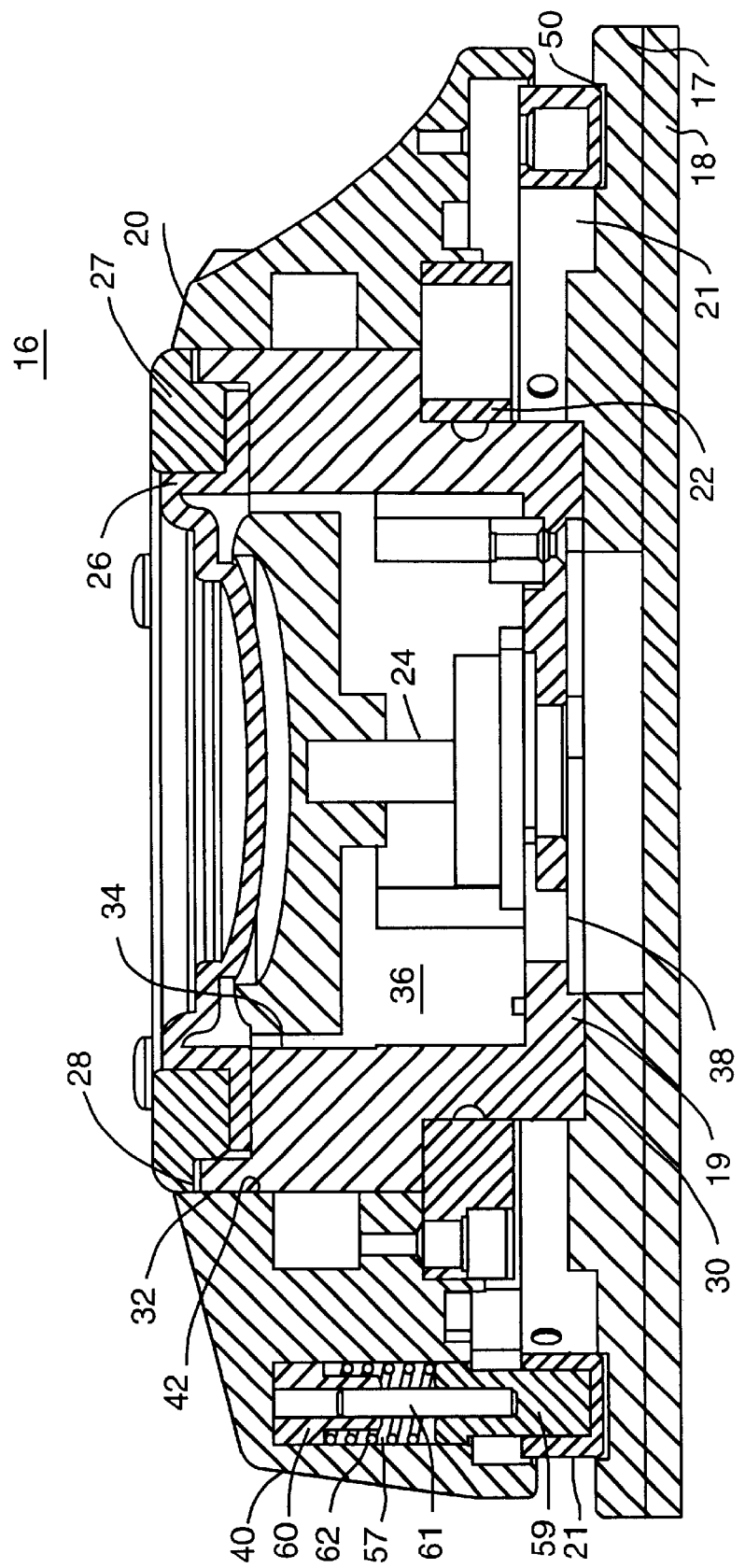
FIG. 5 is a cross sectional view of the multiple switch assembly taken along the lines V—V in FIG. 3.

The switch assembly 16 includes, in the embodiment shown in the figures, three mechanisms 57, seen best in FIGS. 2, 5 and 6, which enable the rotatable dial 20 to be moved between a first vertical position, illustrated in the figures, and a second vertical position (not shown). Each mechanism 57 is comprised of a piston 59 carried by the switch ring 21. A saddle 60 is carried in circular openings in the rotatable dial 20. A guide pin 61 extends between the piston 59 and the saddle 60. The piston 59 and saddle 60 are biased apart by a spring 62. By applying a downward pressure on the rotatable dial 20, the spring 62 is compressed thereby allowing the rotatable dial 20 to move downward with respect to the spine 19. When the rotatable dial 20 moves downward with respect to the spine 19, the open area within the annular switch ring 21 is occupied by the rotatable dial 20. Upon removal of the pressure, the springs 62 bias the rotatable dial 20 back into its first vertical position, as shown in FIG. 5.

Referring to FIG. 2, a magnet 64 is located on a flexible arm 65. Upon movement of the rotatable dial 20 from the first vertical position shown in the figure to the second vertical position, not shown, the magnet 64 is moved in a downward direction toward a Hall effect sensor 66. The Hall effect sensor 66 thus produces a signal whenever the rotatable dial 20 is depressed. After the force is removed and the rotatable dial 20 returns to its normal position, the flexible arm 65 moves magnet 64 away from Hall effect sensor 66. In that manner, depression of the rotatable dial 20 can be used to generate a signal for controlling computer 10.

In another embodiment, the magnets 53 could be located in the portion of the dial 20 which moves along the axis of rotation. In that embodiment, sensing the magnetic field provides an indication of angular position while the strength of the magnetic field provides an indication of whether the dial 20 has been depressed. In that embodiment, the magnet 64, flexible arm 65, and Hall effect sensor 66 may be eliminated.

It is desirable to prevent rotary movement of the dial 20 while it is being moved between the first and second vertical positions. It is also desirable to prevent the rotatable dial 20 from being depressed while it is being rotated. That functionality is accomplished in the following manner. As seen in FIGS. 2 and 4, the spine 19 has a plurality of vertically extending grooves 68 formed, e.g., by milling, along a portion of the outside diameter 19. The snap ring 22 (FIG. 21) has two horizontally extending bores 70 which receive spring biased detent pins 72 (FIGS. 2 and 4). While the rotatable dial 20 is rotating, the spring biased detent pins 72 ride in a circumferential groove 74 which intersects the tops of all of the vertical grooves 68. If a detent pin 72 is not lined up with one of the vertical grooves 68, the rotatable dial 20 cannot be moved from the first to the second vertical position. However, when the spring biased detent pins 72 are aligned with the vertical grooves 68, the rotatable dial 20 can be moved from the first to the second vertical position. While in transit between the first and second vertical positions, and while in the second vertical position, rotation of the rotatable dial 20 is prevented by virtue of the spring biased detent pins 72 being positioned within vertical grooves 68. In that manner, an interlock mechanism is provided so that only one of rotary or vertical motion can be accommodated at a time.

Bumps or depressions (not shown) can be formed within circumferential groove 74 so that interaction of those structures with the spring biased detente pins 72 will provide tactile feedback to the user. Furthermore, the first and second "vertical" positions might not, in fact, be vertical because of the orientation of the computer 10. The "vertical" motion may be viewed as motion along the rotational axis of the dial.

Referring now to FIGS. 4 and 5, the membrane 26 is connected to the top surface 28 of the spine 19 by the top ring 27. The top ring 26 is affixed by pins, screws, or the like so as to provide a watertight inner chamber 36 for the joystick 24 or switch (not shown).

By virtue of the construction of the present invention, the switch module 16 is entirely self contained. Only the leads from the printed circuit board 18 need by connected to the computer 10, and that interface may be easily made watertight. The rotatable dial 20 is free to rotate without fear of contamination from water or other liquids because of the use of the Hall effect sensors 55 in combination with the magnets 53. Additionally, by using Hall effect sensors 55 and magnets 53, a shaft-type rotary transducer is eliminated thereby enabling the overall switch assembly 16 to have a lower profile than is found in the prior art. The present invention, however, is not limited to Hall effect sensors. For example, optical sensors could be used.

With the multiple switch assembly 16 constructed in accordance with the teachings of the present invention, the assembly can be made modular so that different types of multiple switch assemblies can be interchanges with one another. For example, a rotary dial with vertical select, a rotary dial without vertical select, a rotary dial with a center switch and vertical select, a nonrotary dial with vertical select and a center track point, etc. All such combinations are intended to be included within the scope of the present invention. The present invention thus provides a rugged, compact, rotary-dial input device with an integral centrally located joystick or momentary switch. All of these input modalities are ergonomically arranged for single-handed manipulation. The device is particularly suited for use with portable, rugged computing devices, such as wearable or laptop computers.

The multiple switch assembly 16, however configured, is intended for use with computers in place of conventional mouse input devices. For example, the dial can be rotated to scroll through a list (e.g., hyperlinks) shown on display device 12. The rotatable dial 20 can also be depressed to select an item. In the preferred embodiment, the dial 20 cannot be rotated while it is depressed to avoid accidental switching and, conversely, the dial 20 cannot be depressed while it is being rotated.

The rotary dial 20 may have, for example, 16 discrete detent positions. The switch ring 21, as disclosed, has one or more magnets 53 embedded within it. Changes in the rotatable dial's 20 position are detected by the Hall effect sensors 55 carried by the printed circuit board 18. Motion of the dial may produce a binary up/down signal which can be used to scroll through lists. When the dial is pushed down, it brings magnet 64 in close proximity to Hall effect sensor 66 which is also carried by the printed circuit board 18.

The joystick 24 or momentary switch is located along the central axis of the rotatable dial 20 and are commercially available products. The joystick 24, momentary switch, or the dial itself, are all located within a circumference defined by the outer periphery of the dial 20. The invention disclosed herein is ergonomically designed to actuate multiple functions (e.g., scrolling, toggling, pointing, selecting) with single-hand operation, is orientation independent, rugged, and can be operated with diminished haptic/tactile capability such as by people wearing gloves or by people with compromised manual dexterity.

Figure 27:
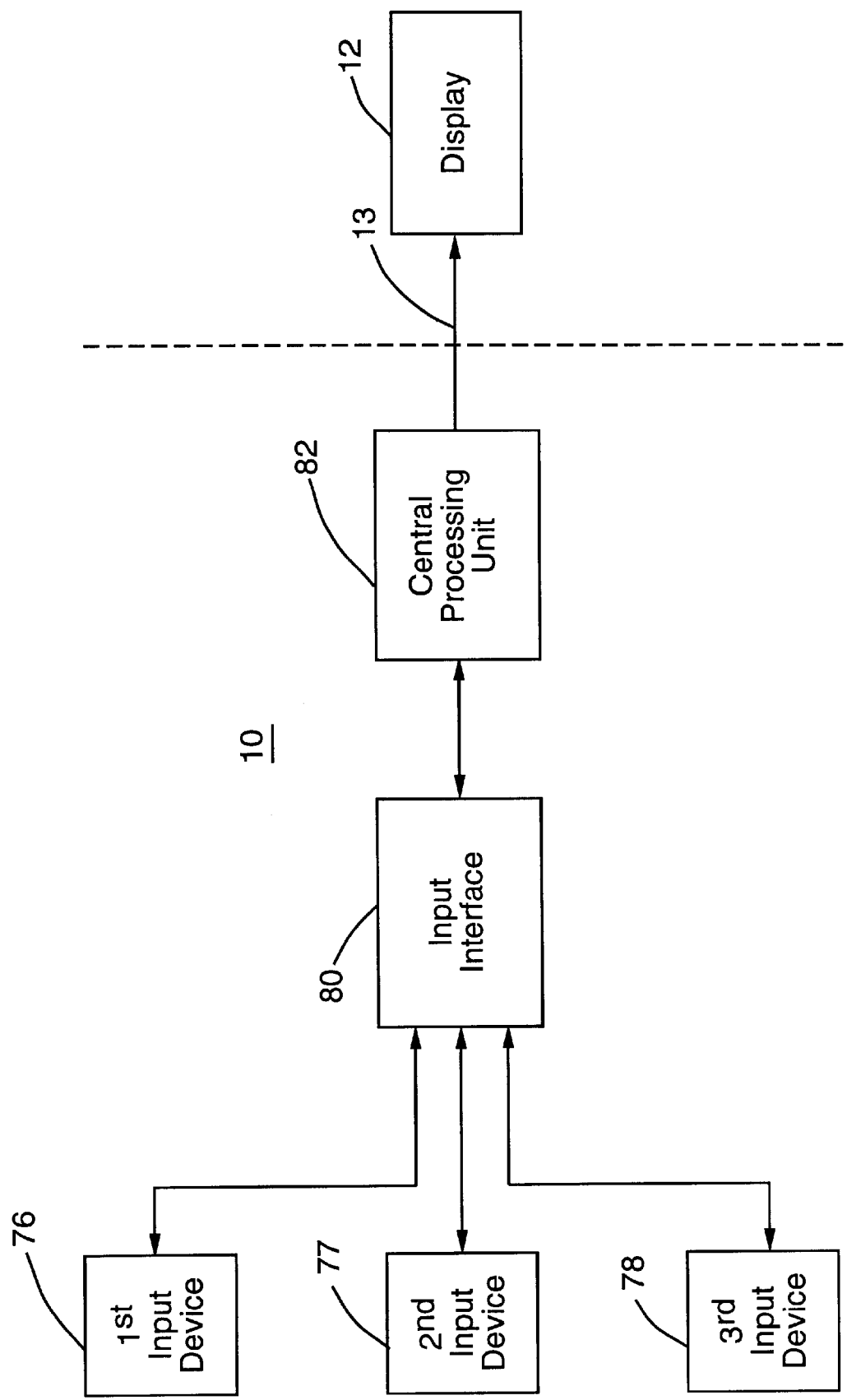
FIG. 27 is a simplified block diagram of the wearable computer system illustrated in FIG. 1.

The electrical aspects of the invention will now be described in connection with FIGS. 27–30. FIG. 27 is a simplified block diagram of the wearable computer system 8 illustrated in FIG. 1. The items to the left of the dotted line in FIG. 27 comprise the computer 10. The computer 10 is comprised of first, second, and third input devices 76, 77, and 78, respectively. Each of the input devices 76–78 produces a signal that is input to an input interface 80. The input interface 80 produces control signals which are input to the central processing unit 82.

Figure 28:
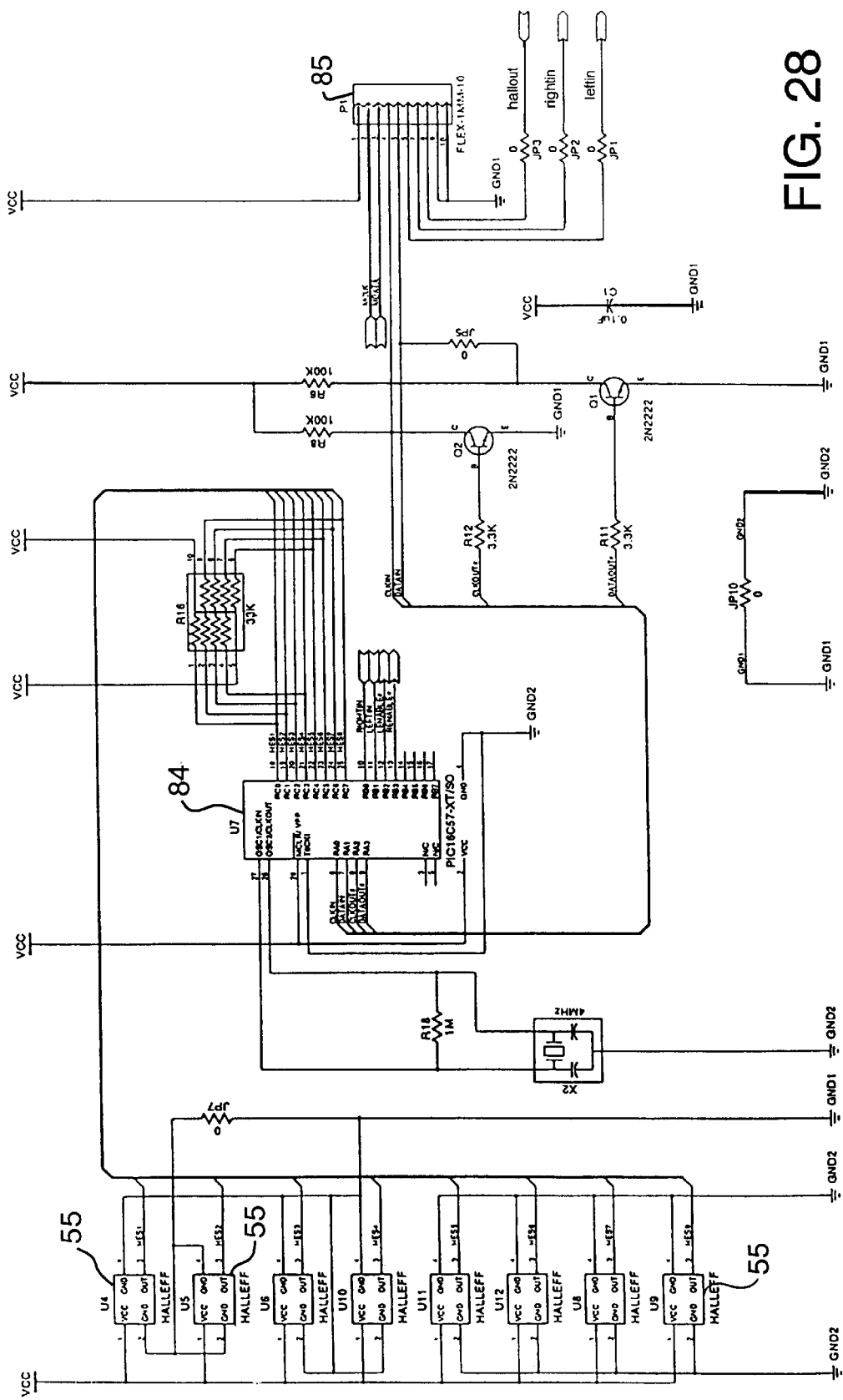
FIG. 28 is an electrical schematic of the Hall effect sensors and the input interface therefor.
Figure 29:
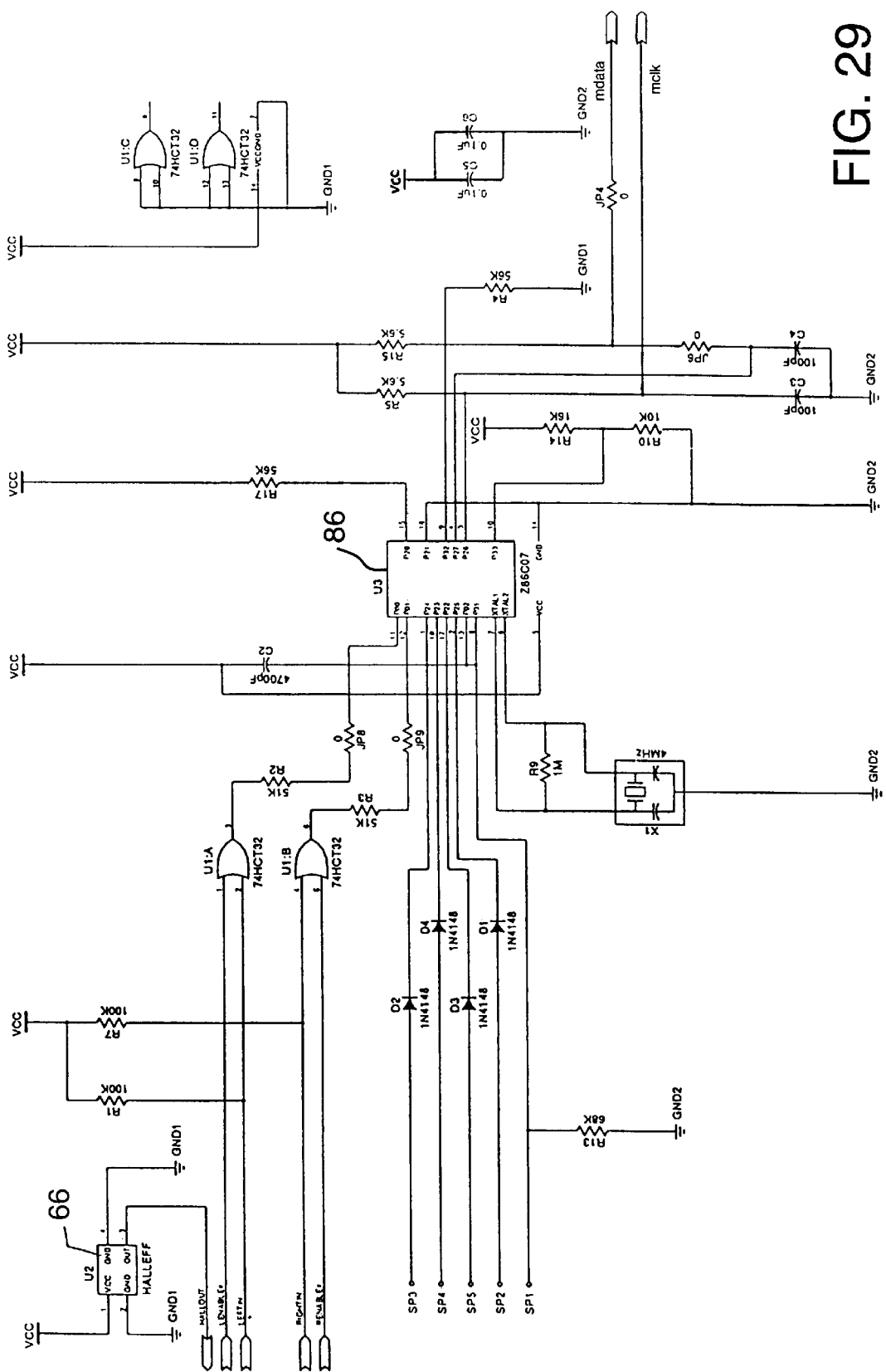
FIG. 29 is an electrical schematic of the microjoystick outputs, second Hall effect sensor, and the input interface therefor.
Figure 30:
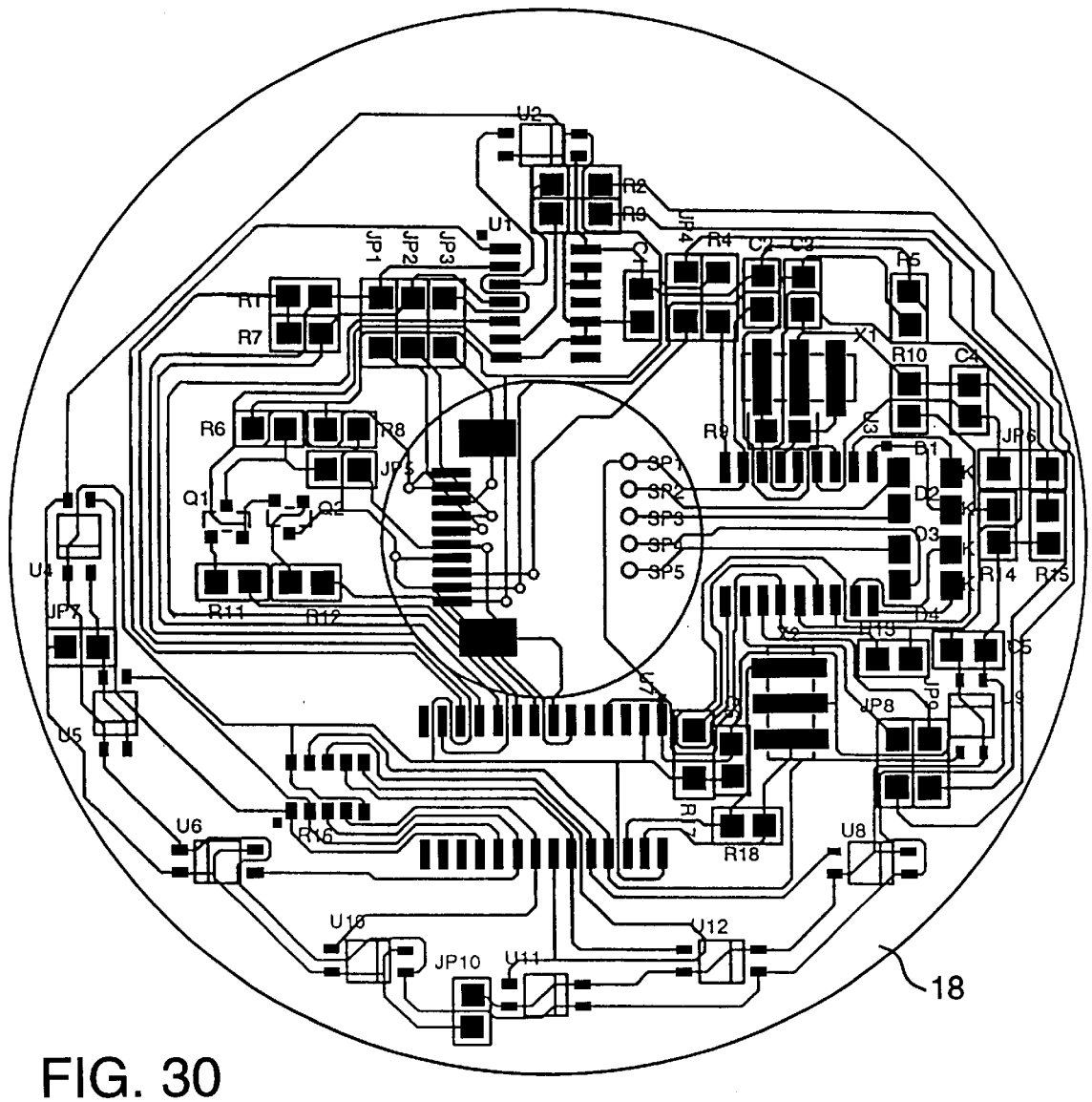
FIG. 30 illustrates the electrical layout of the printed circuit board.

FIGS. 28 and 29 represent an electrical schematic of the printed circuit board 18 while FIG. 30 illustrates the physical layout of the printed circuit board 18. In FIG. 28, the plurality of Hall effect sensors 55 are illustrated. The Hall effect sensors 55, together with magnets 53, perform the function of the first input device 76. A dedicated chip 84 is responsive to the Hall effect sensors 55 so as to produce an output signal input to the central processing unit 82 through a connector 85.

The Hall effect sensor 66 illustrated in FIG. 29 produces a signal Hallout which is input to the chip 84 for processing. The Hall effect sensor 66 together with magnet 64 provides the function of the second input device 77.

In FIG. 29, the signals SP1–SP5 are input to a dedicated chip 86 which produces signals output to the central processing unit 82 through connector 85 in response to movements of the joystick 24. The joystick 24 provides the function of the third input device 78. However, as previously described, in a nonrotating embodiment, the joystick may provide the function of the second input device. Alternatively, in a rotating embodiment, the third input device may be a momentary switch instead of a joystick.

Finally, FIG. 30 shows the physical layout of the printed circuit board 18. The Hall effect sensors 55 are located around the periphery of the printed circuit board 18. The incorporation of Hall effect sensing, or the like, makes the device very rugged for use in harsh environments where it may be exposed to dirt, mud, water, shock, and vibration.

The invention facilitates wearable computing because the operation of the rotary dial is independent of the device orientation. That is, the input action is consistent regardless of the position or orientation in which the dial is mounted or worn. While the device was originally built for rugged, mobile computing applications, its single-handed, multifunctional operation lends itself to conventional desktop applications including games and web browsing.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A multiple switch assembly, comprising:
   a first input device including a rotatable dial defining a circumference and movable along a rotational axis of said dial between a first position and a second position;
   a second input device positioned within the circumference of said dial wherein the second input device includes at least a portion of said first input device;
   an interlock for preventing said dial from being rotated while said dial is being depressed, and for preventing said dial from being depressed while said dial is being rotated; and an interface connected to said first input device and said second input device for producing output signals responsive to said first and second input devices.

2. The multiple switch assembly of claim 1 additionally comprising a third input device positioned within the circumference of said dial.

3. The multiple switch assembly of claim 2 wherein said third input device includes a joystick.

4. The multiple switch assembly of claim 2 wherein said third input device includes a switch.

5. A combination, comprising:
a display;
a first input device including a rotatable dial defining a circumference and movable along a rotational axis of said dial between a first position and a second position;
a second input device positioned within the circumference of said dial wherein the second input device includes at least a portion of said first input device;
an interlock for preventing said dial from being rotated while said dial is being depressed, and for preventing said dial from being depressed while said dial is being rotated;
an interface responsive to said first and second input devices; and
a processor, connected to said display and said interface, for displaying information on said display.

6. The combination of claim 5 additionally comprising a third input device positioned within the circumference of said dial.

7. The combination of claim 6 wherein said third input device includes a joystick.

8. The combination of claim 6 wherein said third input device includes a switch.

9. A wearable computer, comprising:
a housing;
a first input device, said device carried by said housing and including a rotatable dial defining a circumference and movable along a rotational axis of said dial between a first position and a second position;
a second input device positioned within the circumference of said dial wherein the second input device includes at least a portion of said first input device;
an interlock for preventing said dial from being rotated while said dial is being depressed, and for preventing said dial from being depressed while said dial is being rotated;
an input interface carried by said housing and responsive to said first and second input devices;
a display electrically connected to said housing; and
a central processing unit carried by said housing, connected to said display and responsive to said input interface for displaying information on said display.

10. The computer of claim 9 wherein said first input device includes said dial carrying a first magnet and said housing carrying a first plurality of Hall effect sensors responsive to said first magnet.

11. The computer of claim 10 wherein said dial includes a bias mechanism for biasing said dial into the first position, and wherein said bias mechanism permits said dial to be depressed into the second position, depression of said dial causing a second magnet to be moved into proximity with a second Hall effect sensor, said second Hall effect sensor and said second magnet forming said second input device.

12. The computer of claim 11 additionally comprising a third input device positioned within the circumference of said dial.

13. The computer of claim 12 wherein said third input device includes a joystick.

14. The computer of claim 12 wherein said third input device includes a switch.

15. A wearable computer, comprising:
a housing;
a first input device including a rotatable dial defining a circumference and movable along a rotational axis of said dial between a first position and a second position;
a second input device positioned within the circumference of said dial wherein the second input device includes at least a portion of said first input device;
an interlock for preventing said dial from being rotated while said dial is being depressed, and for preventing said dial from being depressed while said dial is being rotated;
an input interface responsive to said first and second input devices;
a display electrically connected to said housing; and
a central processing unit connected to said display and responsive to said input interface for displaying information on said display, said first and second input devices, said input interface, and said central processing unit being carried by said housing in a water tight manner.

16. The computer of claim 15 wherein said first input device includes said dial carrying a first magnet and said housing carrying a first plurality of Hall effect sensors responsive to said first magnet.

17. The computer of claim 16 wherein said dial includes a bias mechanism for biasing said dial into the first position, and wherein said bias mechanism permits said dial to be depressed into the second position, depression of said dial causing a second magnet to be moved into proximity with a second Hall effect sensor, said second Hall effect sensor and said second magnet forming said second input device.

18. The computer of claim 17 additionally comprising a third input device positioned within the circumference of said dial.

19. The computer of claim 18 wherein said third input device includes a joystick, said computer further comprising a membrane covering said joystick.

20. The computer of claim 18 wherein said third input device includes a switch, said computer further comprising a membrane covering said switch.

21. A wearable computer, comprising:
a housing;
a first input device carried by said housing and including:
a rotatable dial carrying a first magnet, wherein said dial defines a circumference and is movable along a rotational axis of said dial between a first position and a second position;
a first plurality of Hall effect sensors responsive to said first magnet; and
a bias mechanism for biasing said dial into the first position, and wherein said bias mechanism permits said dial to be depressed into the second position, depression of said dial causing a second magnet to be moved into proximity with a second Hall effect sensor; and
a second input device positioned within the circumference of said dial and including:
at least a portion of said first input device; and
said second Hall effect sensor and said second magnet; and an input interface carried by said housing and responsive to said first and second input devices;

a display electrically connected to said housing; and a central processing unit carried by said housing, connected to said display and responsive to said input interface for displaying information on said display.

22. The computer of claim 21, additionally comprising an interlock for preventing said dial from being rotated while said dial is being depressed, and for preventing said dial from being depressed while said dial is being rotated.

23. The computer of claim 21, additionally comprising a third input device positioned within the circumference of said dial.

24. The computer of claim 23, wherein said third input device includes a joystick.

25. The computer of claim 23, wherein said third input device includes a switch.

26. A wearable computer, comprising:

a housing;

a first input device including:
- a rotatable dial carrying a first magnet, wherein said dial defined a circumference and is movable along a rotational axis of said dial between a first position and a second position;
- a first plurality of Hall effect sensors responsive to said first magnet; and
- a bias mechanism for biasing said dial into the first position, and wherein said bias mechanism permits said dial to be depressed into the second position, depression of said dial causing a second magnet to be moved into proximity with a second Hall effect sensor; and a second input device positioned within the circumference of said dial and including:
- at least a portion of said first input device; and
- said second Hall effect sensor and said second magnet; and an input interface responsive to said first and second input devices;

a display electrically connected to said housing; and a central processing unit connected to said display and responsive to said input interface for displaying information on said display, said first and second input devices, said input interface, and said central processing unit being carried by said housing in a water tight manner.

27. The computer of claim 26, additionally comprising an interlock for preventing said dial from being rotated while said dial is being depressed, and for preventing said dial from being depressed while said dial is being rotated.

28. The computer of claim 26, additionally comprising a third input device positioned within the circumference of said dial.

29. The computer of claim 28, wherein said third input device includes a joystick.

30. The computer of claim 28, wherein said third input device includes a switch.

* * * * *